Sept. 12, 1944.  J. B. HALE  2,358,065
MACHINE FOR HANDLING STRIP MATERIAL
Filed Jan. 21, 1943  2 Sheets-Sheet 1

Joseph B. Hale
INVENTOR
BY
ATTORNEYS

Sept. 12, 1944. J. B. HALE 2,358,065
MACHINE FOR HANDLING STRIP MATERIAL
Filed Jan. 21, 1943 2 Sheets-Sheet 2
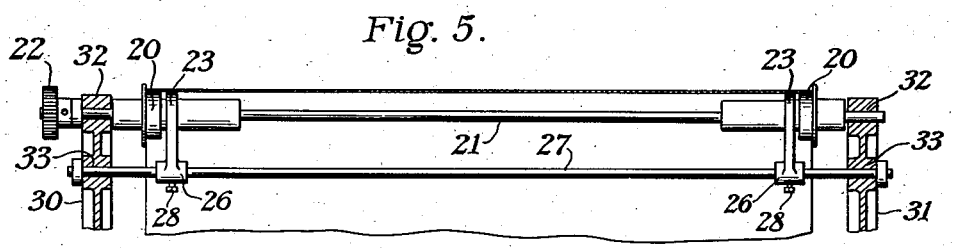
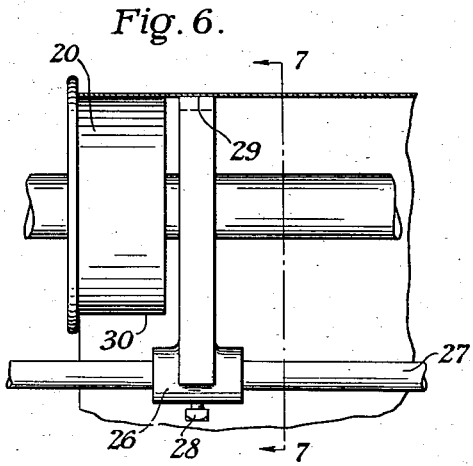
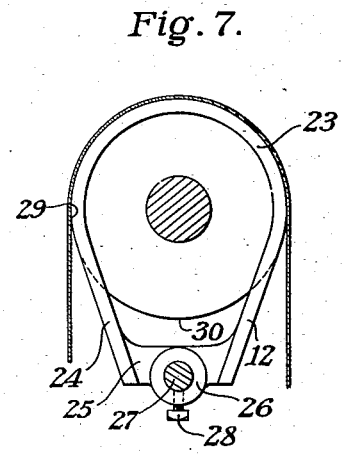
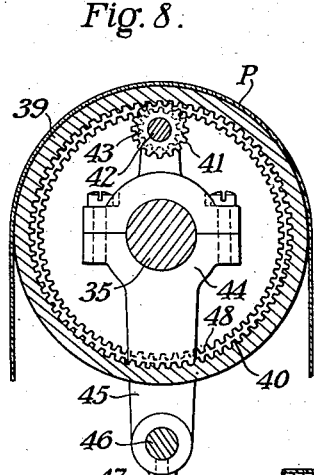
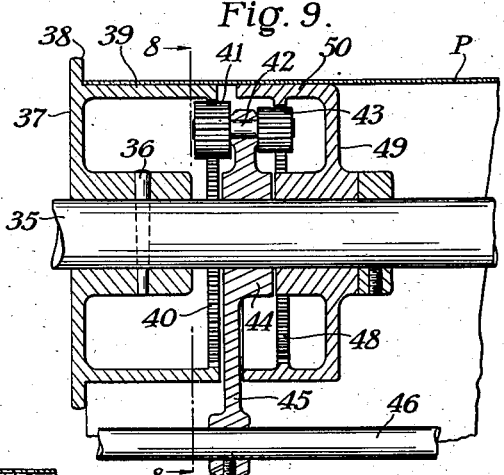
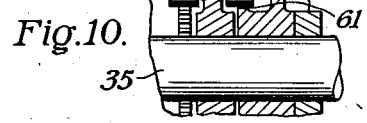
Joseph B. Hale
INVENTOR
BY
ATTORNEYS Patented Sept. 12, 1944

2,358,065

UNITED STATES PATENT OFFICE 2,358,065

MACHINE FOR HANDLING STRIP MATERIAL

Joseph B. Hale, Rochester, N. Y., assignor to Eastman Kodak Company, Rochester, N. Y., a corporation of New Jersey Application January 21, 1943, Serial No. 473,133

13 Claims. (Cl. 271—2.3)

This invention relates to machines for handling long strips of material in such a manner that the machine has a minimum contact with the strip material. One object of my invention is to provide a machine particularly designed for handling strips of plastic sheetings such as films of a polymeric plastic material, such as cellulose derivatives (e. g. cellulose nitrate, cellulose acetate, and other cellulose organic acid esters), and resins (e. g. polyvinyl acetal resins, nylon, etc.) Another object of my invention is to provide a plastic sheet supporting structure in which the support is provided with rollers carrying the edges of the sheet and sheet straightening members adjacent the rollers for smoothing the sheet and causing it to pass through the desired path without buckling.

Other objects will appear from the following specification, the novel features being particularly pointed out in the claims at the end thereof.

It has been proposed to convey long sheets or strips of the type described through machines for processing purposes or for coating on one or both sides with various solutions or for drying or tinting or toning or any other purposes and it has been proposed to provide machines which include edge rollers over which such material can be drawn for the various processing or treating steps. While such machines are usually satisfactory with certain types of sheeting where the thickness of the sheeting is sufficient for the sheet to be supported by the machines, it has been found that certain types of sheetings, particularly when they are relatively thin and particularly when they are subjected to certain treating operations, tend to wrinkle or buckle and the arch in the material as it passes over opposite pairs of supporting rollers tends to break down or at least to mar the film base.

One of the objects of my invention is to overcome these difficulties and to provide, in addition to the edge supporting rollers for the sheeting, members which I call straightening members which engage only a very small portion of the surface of the plastic sheeting, and, yet, which straightening members make possible the use of machines including edge rollers for materials which could otherwise not pass through the machine.

At the present time there are so many factors involved which appear to contribute to the break down of sheeting passing through edge roller machines that I am unable to lay down a definite set of rules as to why the break down occurs, although I do know that one of the primary causes of break down is the nature of the material of which the sheeting is made, the thinner sheets as expected breaking down before thicker sheets and the particular processing operations carried out.

Coming now to the drawings wherein like reference characters denote like parts throughout:

Fig. 5 is a sectional view partially shown in elevation of a second embodiment of my invention;

Fig. 6 is an enlarged side elevation partially in section showing a straightener in accordance with an embodiment of my invention shown in Fig. 5;

Fig. 7 is a sectional view taken on line 7—7 of Fig. 6;

Fig. 8 is an enlarged sectional view taken on line 8—8 of Fig. 9 of a third embodiment of my invention;

Fig. 9 is an enlarged section showing the third embodiment of a preferred form of roller and straightening member; and Fig. 10 is a fragmentary sectional view showing a fourth embodiment of my invention.

My invention comprises broadly in adding to a known type of edge roller plastic sheet supporting machine a device I call a straightening member which is mounted adjacent an edge roller and which contacts with a small portion only of the plastic sheeting having a different frictional contact therewith. My straightening member may be a shoe on which a portion of the sheeting slides; it may be a roller which turns either in the same or in an opposite direction to the film supporting edge rollers, but at a different speed therefrom or it may merely provide a sheet engaging member which has a different frictional contact with the sheet than that of the edge roller. I am not at this time advancing any definite theory as to just why these straightening members work, but prolonged experiments over a considerable period of time definitely show that very favorable results can be obtained with my sheet straightening devices.

Figure 1:
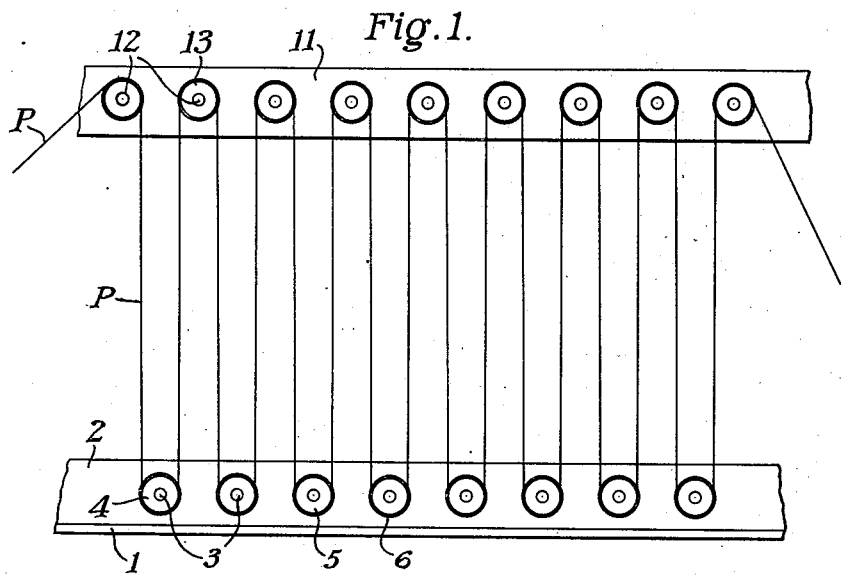
Fig. 1 is a fragmentary side elevation of a schematic showing of a portion of a plastic sheeting edge roll machine which may be equipped with my invention.
Figure 2:
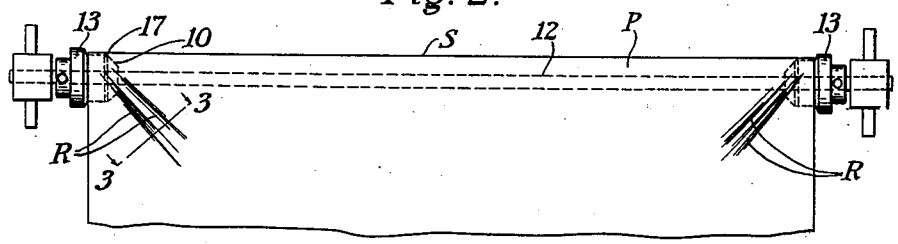
Fig. 2 is a fragmentary transverse view of a portion of the plastic sheeting and a support therefor equipped with straightening members constructed in accordance with and embodying a preferred form of my invention.
Figures 3, 4:
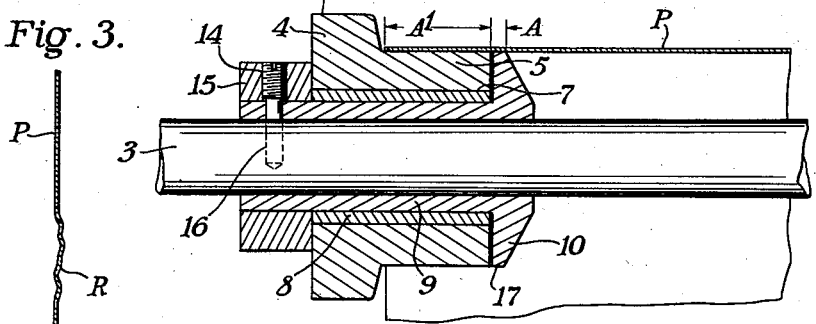
Fig. 3 is an enlarged sectional view taken on line 3—3 of Fig. 2.
Fig. 4 is an enlarged sectional view through a typical edge supporting roller and straightener constructed in accordance with a preferred embodiment of my invention.

Referring to Fig. 1, a typical edge roller plastic sheet machine is diagrammatically shown as including a base 1 from which a frame member 2 extends upwardly to support a plurality of shafts 3 on which flanged rollers, designated broadly as 4, are mounted as indicated in Figs. 2 and 4. The rollers 4 preferably have a cylindrical flange 5 for supporting a sheet of plastic material P by the edges only and they are preferably provided with a guiding flange 6 of somewhat greater diameter than the supporting flange 5. The roller 4 is provided with an internal bore 7 of a diameter to turn freely upon the sleeve shaft 8 which in turn is supported by a sleeve shaft 9 which carries a sheet straightener 10 to be hereinafter more fully described. Referring again to Fig. 1 an upper frame member 11 supports a plurality of shafts 12 on which a plurality of edge rollers 13 are mounted and, since in this embodiment of my invention all of the edge rollers 4 and 13 are mounted similar to the showing of Figs. 2 and 4, reference may be had to Fig. 4 for the construction of the edge roller and sheet straightening device.

The sheet straightener 10 shown in Fig. 4 may be pinned to a shaft 3 by means of a setscrew pin 14 passing through the collar 15 and through the cylindrical member 9 into the shaft 3 at 16 as shown. Consequently, since the shaft 3 is fixedly mounted in the machine section shown in Fig. 1, the straightener 10 will remain stationary while the edge roller 4 turns due to the frictional contact of the edge of the sheet P with the cylindrical portion 5 of the edge roller.

I have found that the exact dimensions of the sheet straightener 10 are not critical, but I prefer to provide a relatively narrow flange 17 of the same or somewhat larger diameter than the cylindrical portion 5 of the edge roller 4. Thus, in this embodiment of my invention the straightening device contacts with the sheet P only through the relatively small area A of the sheet which engages the flange 17 through 180° as it passes in substantially vertical runs through the machine sections shown in Fig. 1. As indicated in Fig. 4, the edge roller contacts with an area A1 of the sheet P which is considerably larger than the area A and it is obvious that the frictional contact between the sheet and the roller and between the sheet and the straightener is different. The roller 4 in this instance turns with the sheet P and the straightener 17 slidably engages the sheet and tends to straighten it.

In order to give some idea of the difficulties involved without a straightener reference may be had to Fig. 2 wherein a sheet P is shown as starting to wrinkle or break down as the sheet approaches a pair of edge rollers 13. The break down starts by one or more wrinkles R which usually occur as the sheet approaches the roller and which may be at substantially 90° to the axis of the roller, although I have observed many different types of wrinkles and the ones described here are merely typical. Referring to Fig. 3 it will be noted that the wrinkles R are actual distortions of the sheet and that it can readily be seen from this figure that if permitted to continue these wrinkles would either break down the molecular structure of the sheet or would leave other undesirable markings thereon. I have found that if the sheet straighteners shown in Fig. 4 are added to the edge rollers (as they have been in Fig. 2) this tendency of the wrinkles R to start is eliminated in a great many cases. In fact, such break down of the sheet is reduced to such an extent that a great many sheets otherwise unsuitable for the edge spool machine can be satisfactorily passed through the machine.

If the sheet P is allowed to pass through a machine without the straightening members shown in Figs. 2 and 3, the wrinkles R become more and more pronounced and the sheet arch S between the pairs of edge rollers may break down and strike the shaft 12 and prevent the progress of the sheet through the machine as well as mar the material.

It is usually necessary to drive certain of the edge rollers in order to move the sheet through the machine and in such instances a structure similar to Fig. 5 may be used wherein the driving rollers 20 may be fixedly mounted on a shaft 21 to be driven by this shaft which, in turn, is driven by the gear 22 from a suitable mechanism not shown. Whether the edge rollers 20 are driven or not it is desirable to provide the sheet straightening members here shown as 23, these sheet straightening members as best shown in Figs. 6 and 7 being merely loops of strip material connected at their lower ends 24 by a bracket 25 having a bearing 26 to slide on the shaft 27 and including a set screw 28 for holding the straightening members in the desired position. In this instance the straightening members have an outside diameter 29 approximately that of the outside diameter 30 of the edge driving rollers 20 and as before the straightening members are adjacent to the edge rollers and provide a different frictional contact with the sheet therefrom. End frame members 30 and 31 include bearings 32 for the shaft 21 and 33 for the shaft 27, the latter shaft of course is fixedly mounted and does not turn.

The two embodiments of the sheet straightening members described above are actually shoes on which the sheeting slides. However, I have also found that the desired result can be obtained by providing movable sheet straightening members and that this movement may take place either in the same direction or in the opposite direction to that of the movement of the edge rollers. The straightening action appears to depend on the differential frictional contact between the straightening members and the sheet and the edge rollers and the sheet.

An embodiment of my invention in which the straightening members turn at a different speed from the edge rollers is shown in Figs. 8 and 9. In these views a power driven shaft 35 drivingly carries by a pin 36 an edge roller 37 flanged at 38 to guide an edge of the sheet P and having a cylindrical surface 39 supporting the edge of the sheet P. In this form of my invention the edge roller 37 is provided with an internal gear 40 which meshes with a pinion 41 carried on a rotatable shaft 42 so as to turn a pinion 43.

Pinions 41 and 43 have a different number of teeth. The shaft 42 is carried by a bracket 44 having a narrow arm 45 extending upwardly from a fixed shaft 46 being positioned thereon by a setscrew 47.

Pinion 43 meshes with an internal gear 48 carried by the sheet straightening member 49 which has a sheet engaging surface 50. When the shaft 35 is driven to turn the edge roller 37 internal gear 40 by meshing with the pinion 41 turns the pinion 43 and with it the internal gear 48 carrying the straightening member 50. Since the pinions 41 and 43 have a different number of teeth the speed of rotation of the edge roller and the adjacent film straightener will be different so that the sheet straightener will have a sliding contact with the sheet, whereas the edge roller will turn with the same surface speed as the sheet. Such an action exerts a satisfactory straightening effect and the degree of straightening effect may be somewhat altered by altering the relative speed of the straightening member and the sheet moving edge roller.

With the different forms of straightening device mentioned above, it will be noticed that in each the edge roller definitely turns at the same surface speed as the sheeting and that the straightening member either does not turn at all or turns at a different surface speed from the speed of movement of the sheet. It is obvious from the forms illustrated that it would be a simple matter to alter the turning movement of the straightening member to change its speed relative to the edge rollers for movement in either the same direction as the roller or in an opposite direction. The construction of Fig. 10 is like that of Fig. 9, except that here the straightening member 60 is provided with an internal gear 61 which meshes with the pinion 43 (instead of the internal gear 48 of Fig. 9) so that the straightening member may be driven in an opposite direction to that of the edge roller rather than in the same direction.

As above explained, these various forms all have a very desirable effect in holding the sheeting P to such a path that wrinkling or buckling together with a more serious breaking down of the arch of the sheet is largely eliminated, so that machines equipped with my sheet straightening members which have previously been considered useful only with a very limited number of types of sheetings and for a limited number of purposes can now be used for many additional types and weights of sheetings.

I claim:

1. In a machine for movably carrying long lengths of plastic sheeting, the combination with a plurality of edge rollers for movably supporting the lateral edges of the sheeting over which said sheeting may be arched, of sheet straightening members comprising sheeting engaging members adjacent the edge rollers and engaging an arched portion of said sheet supported by the edge rollers, the rollers and straightening members having a different coefficient of friction with respect to the edges of the sheeting whereby the edges thereof may be subjected to closely adjacent and different forces.

2. In a machine for movably carrying long lengths of plastic sheeting, the combination with a plurality of edge rollers for movably supporting the lateral edges of the sheeting over which said sheeting may be arched, of sheet straightening members comprising sheeting engaging members adjacent the edge rollers and engaging an arched portion of the sheet, the rollers and straightening members having a different coefficient of friction with respect to the edges of the sheeting whereby the edges thereof may be subjected to closely adjacent and different forces, the straightening members comprising shoes adjacent the edge rollers and positioned to contact the lateral edges of the sheeting.

3. In a machine for movably carrying long lengths of plastic sheeting, the combination with a plurality of edge rollers for movably supporting the lateral edges of the sheeting, of sheet straightening members comprising sheeting engaging members adjacent the edge rollers, the rollers and straightening members having a different coefficient of friction with respect to the edges of the sheeting whereby the edges thereof may be subjected to closely adjacent and different forces, the straightening members comprising shoes adjacent the edge rollers having a curved edge approximating the diameter of the edge rollers and having a sliding engagement with lateral edges of the sheeting.

4. In a machine for movably carrying long lengths of plastic sheeting, the combination with a plurality of edge rollers for movably supporting the lateral edges of the sheeting, of sheet straightening members comprising rollers mounted adjacent the edge rollers, and means for turning the straightening rollers at a speed different from that of the edge rollers.

5. In a machine for movably supporting long strips of plastic sheeting, the combination with a plurality of edge rollers adapted to contact with the edges of the plastic sheeting guiding said sheeting through a curved path, and straightening means adjacent at least some of said rollers and contacting with said plastic sheeting adjacent the point where said sheeting contacts with the edge rollers and where the sheeting is guided thereby through said curved paths to supply a smoothing action to said plastic sheet.

6. In a machine for handling long strips of plastic material, the combination with a support, a plurality of oppositely disposed flanged rollers mounted thereon for movably supporting opposite lateral edges of the plastic material, and means adjacent said flanged rollers for slidably engaging opposite lateral portions of the plastic sheet adjacent the edges supported on the flanged rollers.

7. In a machine for handling long strips of plastic material, the combination with a support, a plurality of oppositely disposed flanged rollers mounted thereon for movably supporting opposite lateral edges of the plastic material, and means adjacent said flanged rollers for slidably engaging opposite lateral portions of the plastic sheet adjacent the edges supported on the flanged rollers, said means comprising relatively fixed shoes adjacent the peripheries of the flanged rollers.

8. In a machine for handling long strips of plastic material, the combination with a support, a plurality of oppositely disposed flanged rollers mounted thereon for movably supporting opposite lateral edges of the plastic material, and means adjacent said flanged rollers for slidably engaging opposite lateral portions of the plastic sheet adjacent the edge supported on the flanged rollers, said means comprising shoes adjacent to and having a shape approximating at least part of the contour of the flanged rollers.

9. In a machine for handling long strips of plastic material, the combination with a support, a plurality of oppositely disposed flanged rollers mounted thereon for movably supporting opposite lateral edges of the plastic material, and means adjacent said flanged rollers for slidably engaging opposite lateral portions of the plastic sheet adjacent the edges supported on the flanged rollers, said means comprising curved surfaces at least partially supporting the lateral margins of a plastic sheet the edges of which are carried by said flanged rollers.

10. In a machine for handling long strips of plastic material, the combination with a support, a plurality of oppositely disposed flanged rollers mounted thereon for movably supporting opposite lateral edges of the plastic material, and means adjacent said flanged rollers for slidably engaging opposite lateral portions of the plastic sheet adjacent the edges supported on the flanged rollers, said means comprising secondary rollers adjacent the flanged rollers and of substantially the same diameter, and means for moving the secondary rollers differentially from the flanged edge rollers.

11. In a machine for movably supporting long lengths of plastic sheeting, the combination with a support, of a plurality of flanged rollers for contacting with and forming a path of movement for the plastic sheeting, certain of said rollers only partially supporting a lateral edge of the sheeting, and sheet straightening members mounted adjacent said rollers and partially supporting said plastic sheeting, both partial supports for said sheeting being of such dimensions that only a very small area of the edges of the plastic sheeting are supported and the major portion thereof is unsupported.

12. A support for handling long lengths of plastic sheeting comprising a plurality of spaced pairs of edge supporting members, one member of each pair comprising a flanged roller adapted to turn and the other member of each pair comprising a member adjacent the roller but not adapted to turn with the flanged roller, whereby adjacent areas of an edge of the sheet may be differentially supported.

13. In a machine for movably carrying long lengths of plastic sheeting, the combination with a base, of pairs of edge rollers mounted on the base each pair being carried in spaced axial relation, means adjacent at least some of the rollers for engaging an edge of the sheeting, said roller and said means lying adjacent but slightly spaced, the roller moving with the velocity of said sheeting and the means providing a frictional and sliding contact with respect to said sheeting, both said roller and said means engaging an extremely small area of the sheeting passing through said machine.

JOSEPH B. HALE.